Aug. 21, 1956

T. S. HOLMES 2,759,703

CARGO WINCH

Filed March 5, 1954

INVENTOR.
TRACY S. HOLMES
BY Fulwider Mattingly & Babcock
Attorneys

Aug. 21, 1956     T. S. HOLMES     2,759,703
CARGO WINCH
Filed March 5, 1954     2 Sheets-Sheet 2
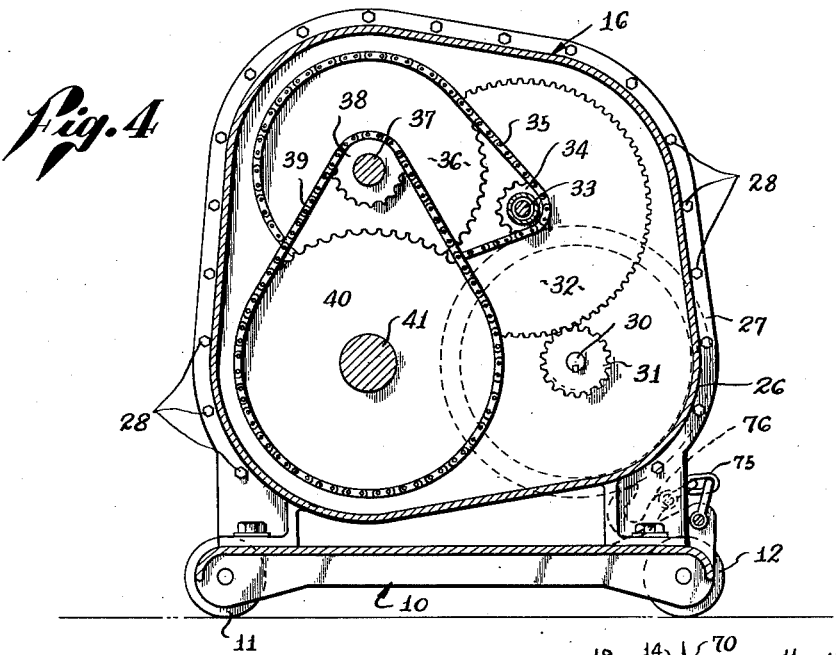
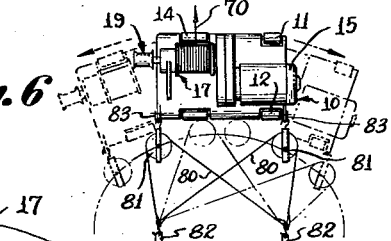
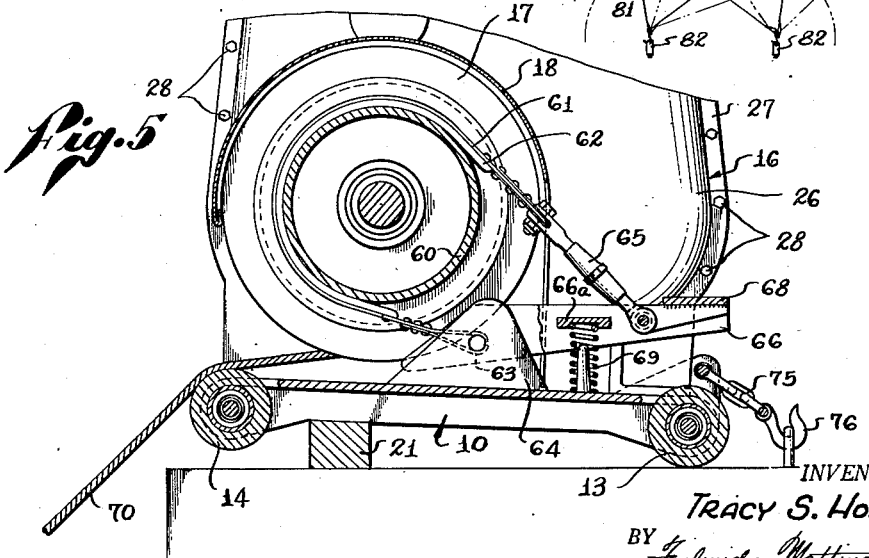
INVENTOR.
TRACY S. HOLMES
BY Fulwider Mattingly & Babcock
Attorneys

United States Patent Office 2,759,703
Patented Aug. 21, 1956

2,759,703

CARGO WINCH

Tracy S. Holmes, Santa Monica, Calif.

Application March 5, 1954, Serial No. 414,471

4 Claims. (Cl. 254—186)

This invention relates generally to winches and similar hoisting and hauling equipment and more particularly to a winch designed especially for use in loading, stowing, and unloading airborne cargo.

In the practical carrying of freight by aircraft, it is necessary that every practicable means be taken to avoid extra weight in the equipment installed in the aircraft and used to load, unload, and move cargo within the aircraft. Thus, while cargo-handling winches are very often permanent installations in sea-going cargo vessels and not infrequently found as permanent installations in railway freight-carrying vehicles and freight-carrying trucks and trailers, it is highly desirable that cargo winches used in loading air cargo be of a portable nature, not carried by the aircraft, and yet designed to perform efficiently the operations of hauling cargo into the aircraft and also moving and stowing the same within the cargo spaces provided.

Another problem peculiar to the handling of air cargo as opposed to other types, is the fact that the loading hatches and doors in aircraft are almost always located a considerable distance above the ground on which the aircraft rests, and are usually found in the sides or under the surface of the hull as opposed to the top opening hatches found in sea-going vessels. This disposition of the loading hatches necessitates ramps or other elevating means to drag the cargo from the ground surface up to the aircraft. Such ramps are usually portable, or, in some cases, constructed as a portion of the aircraft hull itself. In any case, the loading hatches are almost always limited to one, or at the most two, in number, making it usually necessary to haul all of the freight in through a single aperture and thereafter move it about inside the hull of the aircraft. For the latter purposes as well as for hauling freight up loading ramps, a specially designed winch is desirable.

Hauling equipment available heretofore has not combined the features necessary to the above type of operation in a single, relatively lightweight portable unit. Accordingly, it is a major object of the present invention to provide an air cargo-handling winch particularly adapted for use in loading cargo into aircraft and moving the same within the hull of the aircraft during loading and unloading operations.

It is another object of the present invention to provide a device of the class described which is easily operated by relatively unskilled personnel.

It is still another object of the present invention to provide a device of the class described which is readily moved from one place to the other and is especially adapted to be anchored in various positions within an aircraft for the purposes above described.

It is a further object of the present invention to provide means in a hauling unit of the class described which is adapted to haul material in a number of different directions toward a single anchorage point.

The foregoing and additional objects and advantages of the present invention will be apparent from the following detailed description of a presently preferred embodiment thereof, such consideration being given likewise to the attached drawings in which:

Figure 4 is an elevational section taken on the line 4—4 in Figure 2;

Figure 5 is a fragmentary elevational section taken on the line 5—5 in Figure 2 showing the winch anchored in the position of use; and Figure 6 is a semi-schematic plan view illustrating a special anchoring bridle which adapts the winch shown in the previous figures to haul material from various directions toward the point of anchorage.

Figure 1:
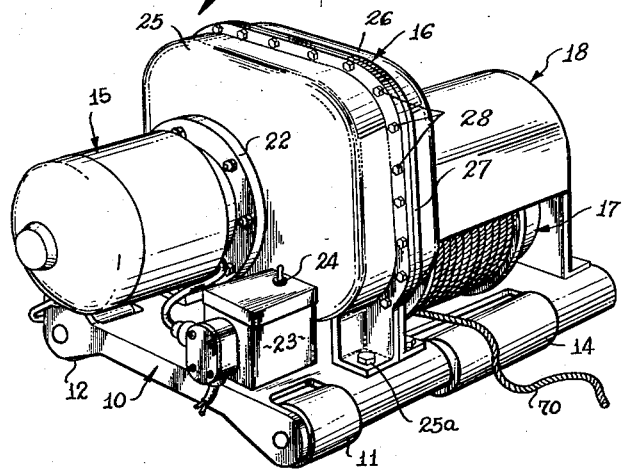
Figure 1 is a perspective view of an air cargo winch embodying my invention.
Figure 3:
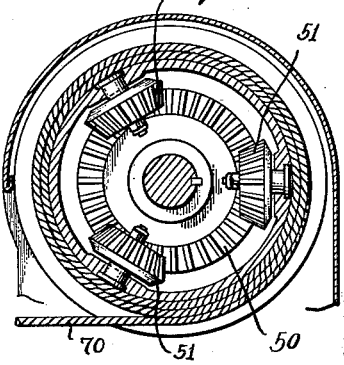
Figure 3 is an elevational section taken on the line 3—3 in Figure 2.
Figure 2:
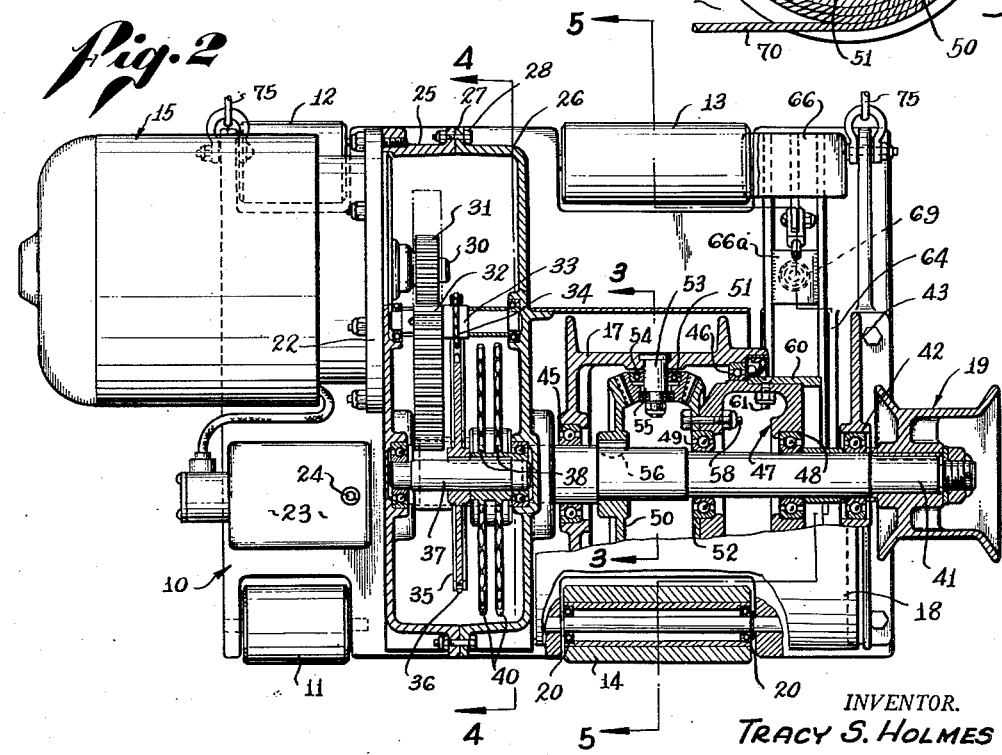
Figure 2 is a horizontal, partially sectioned view of the device shown in Figure 1 showing the interior construction thereof.

Basic elements making up the winch embodying my invention can be seen best in Figures 1 and 2, and comprise a base frame or chassis 10 mounted on rollers 11, 12, 13, and 14, an electric motor prime mover 15, a power transmission 16, an assembly including a cable drum 17, a drum housing 18 and a capstan head 19.

The chassis 10 may be cast from some lightweight material such as aluminum, or alternatively may be fabricated as by welding out of sheet material. The rollers, 11, 12, 13, and 14, are mounted on the chassis 10 on ball bearings 20, and serve to facilitate the movement of the winch unit from one place to another. One of the rollers 14 is coextensive with the length of the cable drum 17 and mounted in front of the same so as to serve as a cable guide as can be seen best in Figure 5. When it is desired to use the roller 14 as a cable guide, the forward edge of the winch unit is blocked up by a block or other object 21 placed under the chassis 10 as shown in Figure 5.

The prime mover in the present case is an electric motor 15 having an end mounting flange 22 by which the same is secured to the power transmission 16. The motor 15 is provided with the conventional junction box 23 and a suitable starting switch 24.

The transmission 16 includes a two-piece split housing 25—26, the respective halves of which are secured together by externally projecting flanges 27 and bolts 28. The housing 25—26 supports the gears and sprockets of the power transmission to be described, and is bolted to the chassis 10 as shown at 25a.

The gear and sprocket train making up the power transmission is best seen in Figure 4. Here it will be seen that the motor shaft 30 projects into the interior of the housing 25—26 and has mounted thereon a drive pinion 31. The drive pinion 31 meshes with a relatively large driven gear 32 mounted on an idle shaft 33 on which is also mounted a drive sprocket 34 drivingly connected by a sprocket chain 35 to a relatively large driven sprocket 36 mounted on an idle shaft 37. On the latter shaft is also mounted a second drive sprocket 38 in turn drivingly connected by a sprocket chain 39 to a relatively large driven sprocket 40 mounted on a main power shaft 41.

It will be seen that inasmuch as each of the driven gears or sprockets 32, 36 and 40 is considerably larger than the respective gear or sprocket which drives it, a substantial speed reduction and a corresponding increase in torque is effected as between the motor shaft 30 and the main power shaft 41. Inasmuch as the torque transmitted at the last stage of speed reduction through the sprocket chain 39 is relatively high, a double sprocket, i. e., one designed to carry two chains is employed at this point (see Figure 2).

The idle shafts 33 and 37 and the main shaft 41 are all journaled in ball bearings mounted in the respective halves of the housing 25—26. Additionally, the outboard end of the main power shaft 41 is supported in a ball-bearing 42 carried in an upstanding end plate 43 which forms a part of the drum housing 18.

The capstan head 19 is secured to the outer end of the main power shaft 41 which projects beyond the end plate 43, and rotates at all times that the motor 15 is operating. The capstan head 19 is employed for relatively light loads by taking a turn of line around the head and tightening the same to obtain the assistance of the motor in hauling in on the line.

The winch drum 17 is mounted on inboard and outboard ball bearings 45 and 46 respectively (see Figure 2), the inboard bearing 45 being supported on the main power shaft 41 and the outboard bearing 46 being supported on a brake drum assembly 47 which is in turn supported on ball bearings 48 and 49, carried on the main power shaft 41.

From the foregoing description, it will be seen that in the absence of other interconnecting elements, the drum 17 is free to rotate with respect to the shaft 41, and also with respect to the brake drum assembly 47. The latter, in turn, is free to rotate with respect to the power shaft 41.

Powered rotation of the winch drum 17 is accomplished by means of a planetary drive interconnecting the shaft 41 and the drum 17, and comprising a bevel sun gear 50, three bevel planet gears 51, and a selectively arrestable bevel gear 52. The three planet gears 51 are rotatably carried on stub shafts 53 being provided with ball bearings 54 and 55, and the stub shafts 53 are fixed in the drum of the winch 17.

The driving sun gear 50 is keyed to the main drive shaft 41 as indicated at 56. As thus far described, it will be seen that rotation of the main shaft 41 operates through the sun gear 50 to rotate the planet gears 51 about their own shafts 53.

The arrestable, or outboard bevel gear 52 is secured to the brake drum assembly 47 by bolts 58 and thus the brake drum assembly 47 and the outboard bevel gear 52 rotate together on the bearings 48 and 49.

It will be seen that so long as the outboard bevel gear 52 is free to rotate, the winch drum 17 will remain at rest and the outboard bevel gear 52 will be driven in the opposite direction from the driving sun gear 50 through the intermeshing of the planet gears 51. If the rotation of the outboard gear 52 is arrested, however, it will then be seen that the driving rotation of the planet gears 51 will cause the same to move in an orbital motion around the axis of the shaft 41, the speed of such orbital rotation being one-half the speed of the sun gear 50 and the shaft 41.

Accordingly, the control of the winch drum 17 is accomplished by selectively arresting the rotation of the outboard bevel gear 52, or allowing the same to rotate with respect to the shaft 41.

Control of the rotation of the outboard bevel gear 52 is accomplished by means of a brake assembly, details of which can be seen best in Figures 2 and 5. As shown in Figure 2, a brake drum 60 is secured by bolts 61 to the brake drum assembly 47, for rotation therewith. The brake drum 60 projects to the right in Figure 2, and is surrounded by a brake band 61, the latter having lining 62 secured thereto in the conventional manner. One end of the brake band is anchored to the chassis by means of a transverse pin 63 carried in an upstanding flange 64 formed as part of the chassis 10. The other end of the brake band 61 is coupled through a conventional turnbuckle attachment 65, to the outer end of a foot lever 66, the inner end of which is pivoted by the pin 63 to the upstanding flange 64. A compression spring 69 anchored against the chassis 10 and pressing upwardly against a lug 66a on the lever 66, serves to hold the brake in a normally "off" position.

Thus, it will be seen that downward pressure on the pedal 68 at the outer end of the foot lever 66 tensions the brake band 61, drawing the lining 62 tightly against the brake drum 60, and stopping the rotation of the brake drum assembly 47, and hence, the outboard bevel gear 52. This, in turn, causes powered rotation of the winch drum 17 as previously described. The area of the lining 62 is sufficiently large so that if desired, the brake comprising the band 61 and the drum 60, may be allowed to slip slightly, thus reducing the torque, and also the speed of the drum 17. This type of operation and control of the winch drum is particularly desirable since it permits the tension in the winch line 70 to be applied and/or released gradually rather than suddenly such as might break the line due to the starting inertia of the load, or cause other damage.

It will be noted that due to the relative position of the forward roller 14 with respect to the winch drum 17, the winch line 70 may be led off at a relatively sharp downward angle such as that shown in Figure 5, whereby loads may be drawn up a steep ramp if desired. Furthermore, it will be noted that a wide roller-like guide of this type permits the line to traverse back and forth across the width of the winch drum 17 whereby to properly "lay" the successive turns on the drum.

Means for anchoring the winch in any desired position are provided in the form of short links of chain 75 having terminal hooks 76 thereon as can be seen in Figure 4. The hooks 76 are conveniently anchored to the usual hold-down fixtures provided in the floors of aircraft cargo spaces.

In Figure 6 is shown a special arrangement for use in connection with the above-described winch when the same is to be used for hauling material in various directions to a centralized point. Here it will be seen that a bridle, consisting of two loops 80 and a pair of pulley blocks 81, are used to secure the winch chassis 10 to a pair of hold-down fixtures 82. The opposite ends of the two loops 80 are secured to the respective hold-down fixtures 82, and the pulley blocks 81 through which the loops 80 are passed, are secured to shackles 83 attached to the chassis 10. Thus, as indicated by the dotted lines, the entire winch frame 10 is permitted to be slid around in various directions so that the winch line 70 is always pulled in a line substantially perpendicular to the rotary axis of the winch drum 17.

While the form of the device illustrated and described herein is fully capable of achieving the objects and providing the advantages hereinbefore stated, it will be realized that such form is capable of modification without departure from the spirit of the invention. For this reason, I do not mean to be limited to the form shown and described, but rather to the scope of the appended claims.

I claim:

1. A winch of the class described comprising in combination: a chassis; a prime mover mounted on said chassis; drive means coupled to said prime mover to be continuously rotated thereby; a capstan head mounted on said drive means for rotation therewith; a winch drum mounted on said chassis for independent rotation adjacent said drive member; speed reduction means interengaged between said drum and drive member, said speed reduction means having selective control means therein to drivingly couple, or decouple said drum and driving means while the latter rotates continuously; and a roller journally mounted adjacent a forward edge of said chassis engageable with a supporting surface to facilitate movement of said chassis, said roller being of substantially the same axial length as said drum and being positioned on an axis parallel to that of said drum and adjacent the periphery of said drum to serve as a guide for a line wound on said drum and projecting therefrom.

2. A winch of the class described comprising in combination: a chassis; a prime mover mounted on said chassis; drive means coupled to said prime mover to be continuously rotated thereby; a winch drum mounted on said chassis for independent rotation adjacent said drive means; speed reduction means having selective control means therein to drivingly couple or de-couple said drum and driving means while the latter rotates continuously; and a roller journally mounted adjacent the forward edge of said chassis and engageable with a supporting surface to facilitate movement of said drum whereby to serve as a guide for a line wound on said drum, said roller being so positioned with respect to said chassis as to project beyond the same to engage a supporting surface and facilitate movement of said chassis on said supporting surface.

3. A winch of the class described comprising in combination: a chassis; a prime mover mounted on said chassis; a drive member extending from said prime mover and connected thereto to be continuously rotated thereby; a capstan head mounted on said drive member for continuous rotation therewith; a winch drum mounted on said chassis for independent rotation adjacent said drive member; speed reduction gearing interengaged between said drum and drive member, said gearing including selective control means therein to drivingly couple or de-couple said drum and driving member while the latter rotates continuously; and a guide roller journally mounted adjacent said drum on an axis parallel to that of said drum, said roller having an axial length substantially equal to that of said drum whereby to serve as a guide for a line wound on said drum, said roller being so positioned with respect to said chassis as to project beyond the same to engage a supporting surface and facilitate movement of said chassis on said supporting surface.

4. A winch of the class described comprising in combination: a chassis; a prime mover mounted on said chassis; a drive member extending from said prime mover and connected thereto to be continuously rotated thereby; a capstan head mounted on said drive member for continuous rotation therewith; a winch drum mounted on said chassis for independent rotation; selective drive control means positioned and adapted to drivingly couple or de-couple said drum and driving member while the latter rotates continuously; and a guide roller rotatably mounted on an axis parallel to that of said drum and being equal in length to said drum whereby to serve as a guide for a line extending from said drum, said guide roller being so positioned with respect to said chassis as to project beyond the same to engage a supporting surface and facilitate movement of said chassis thereon.

References Cited in the file of this patent

UNITED STATES PATENTS

| | | |
|---|---|---|
| 732,377 | Rowntree | June 30, 1903 |
| 1,252,174 | Ramsey | Jan. 1, 1918 |
| 1,953,151 | Cahill | Apr. 3, 1934 |
| 2,309,759 | Ferguson | Feb. 2, 1943 |
| 2,330,303 | Morkoski | Sept. 28, 1943 |
| 2,583,557 | Foy | Jan. 29, 1952 |

FOREIGN PATENTS

| | | |
|---|---|---|
| 422,732 | France | Jan. 27, 1911 |
| 691,764 | Germany | June 5, 1940 |